United States Patent
Korapala et al.

(10) Patent No.: US 12,130,784 B2
(45) Date of Patent: *Oct. 29, 2024

(54) USING MACHINE LEARNING TO PROVIDE A SINGLE USER INTERFACE FOR STREAMLINED DEPLOYMENT AND MANAGEMENT OF MULTIPLE TYPES OF DATABASES

(71) Applicant: VJ Solutions LLC, Round Rock, TX (US)

(72) Inventors: Janardhan Korapala, Round Rock, TX (US); Veda Kumari Guggulla, Round Rock, TX (US)

(73) Assignee: VJ Solutions LLC, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,923

(22) Filed: Oct. 23, 2023

(65) Prior Publication Data
US 2024/0070123 A1     Feb. 29, 2024

Related U.S. Application Data

(63) Continuation of application No. 17/840,720, filed on Jun. 15, 2022, now Pat. No. 11,829,335.

(51) Int. Cl.
| | |
|---|---|
| *G06F 16/24* | (2019.01) |
| *G06F 8/61* | (2018.01) |
| *G06F 9/445* | (2018.01) |
| *G06F 9/54* | (2006.01) |
| *G06F 16/21* | (2019.01) |
| *G06F 16/23* | (2019.01) |
| *G06F 16/2455* | (2019.01) |
| *G06F 16/248* | (2019.01) |
| *G06F 21/44* | (2013.01) |

(52) U.S. Cl.
CPC ............... *G06F 16/21* (2019.01); *G06F 8/61* (2013.01); *G06F 9/44526* (2013.01); *G06F 9/541* (2013.01); *G06F 16/23* (2019.01); *G06F 16/2455* (2019.01); *G06F 16/24556* (2019.01); *G06F 16/248* (2019.01); *G06F 21/44* (2013.01)

(58) Field of Classification Search
None
See application file for complete search history.

(56) References Cited

U.S. PATENT DOCUMENTS

| | | | |
|---|---|---|---|
| 11,423,111 B2 * | 8/2022 | Vaishnavi | G06F 16/953 |
| 2021/0034440 A1 * | 2/2021 | Arendt | G06F 11/3086 |

* cited by examiner

*Primary Examiner* — Craig C Dorais
(74) *Attorney, Agent, or Firm* — Shiv S. Naimpally; Flagship Patents (57) ABSTRACT

In some aspects, a first plug-in module that is installed on a server receives an instruction to install a particular database on a first target server that is near (e.g., less than a threshold number of hops from or having less than a threshold latency communicating with) the server. The first plug-in module creates a first persistent authentication session between the server and the first target server and initiates a first installation of a first database on the first target server using the first persistent authentication session. Concurrently with the first installation, a second plug-in module that is installed on a second server initiates a second installation of a second database on a second target server using a second persistent authentication session. The second target server is near the second server.

20 Claims, 7 Drawing Sheets

USING MACHINE LEARNING TO PROVIDE A SINGLE USER INTERFACE FOR STREAMLINED DEPLOYMENT AND MANAGEMENT OF MULTIPLE TYPES OF DATABASES

RELATED APPLICATIONS AND DOCUMENTS

This application is a continuation application of co-pending, commonly-assigned U.S. patent application Ser. No. 17/840,720, entitled, "Using Machine Learning to Provide a Single User Interface for Streamlines Deployment and Management of Multiple Types of Databases," filed on Jun. 15, 2022. The priority application is hereby incorporated by reference herein in its entirety for all purposes as if fully set forth herein.

BACKGROUND OF THE INVENTION

Field of the Invention

This invention relates to a system that can quickly deploy and manage multiple types of databases (e.g., from multiple database providers). The term manage includes various types of operations related to a database, including installation, provisioning, migrating, replicating, assessing health, and the like.

Description of the Related Art

Current databases and their corresponding management systems suffer from numerous issues. For example, installing and provisioning a database takes a long time. In addition, an Enterprise, such as a large company that grows through acquisition, may have multiple databases from multiple database providers (e.g., Oracle, MongoDB, Cassandra, and the like). To manage (including installation, provisioning, migrating, replicating, assessing health, and the like) the databases, a database administrator may open a first database management tool to manage a first database from a first database provider, open a second database management tool to manage a second database from a second database provider, and so on. Thus, using each database provider's tools to manage each database provider's database is cumbersome and time consuming and does not provide an administrator with an end-to-end view of all the databases used in the Enterprise.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, a first plug-in module that is installed on a server receives an instruction to install a particular database on a first target server that is near (e.g., less than a threshold number of hops from or having less than a threshold latency communicating with) the server. The first plug-in module creates a first persistent authentication session between the server and the first target server and initiates a first installation of a first database on the first target server using the first persistent authentication session. Concurrently with the first installation, a second plug-in module that is installed on a second server initiates a second installation of a second database on a second target server using a second persistent authentication session. The second target server is near the second server.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

The systems and techniques use several different components to enable an enterprise to seamlessly and easily manage databases from multiple database providers. A first component is a user interface that is installed on a device used by, for example, a system administrator. The user interface (e.g., a graphical user interface (GUI)) enables a user to provide commands in English (or another spoken language). A second component is a natural language processor (NLP) and a machine learning algorithm that determines an intent of the commands provided in English (or another spoken language) and converts these into generic database commands, identifies one or more target databases (e.g., to which the commands are to be performed), and sends the generic database commands to the target databases. The term "generic database commands" refers to database commands that are used internally by the systems and techniques described herein and are not specific to any particular vendor's database. A third component is a plug-in module that is installed near or close to each target database. As used herein, the terms "near" and "close" indicate that the plug-in module is located either on the same server as the target database or on a server that is, from a networking perspective, close/near the target database. For example, the server hosting the plug-in module may send a message to the server hosting the target database in such a way that the message is routed with less than a threshold number of hops. In networking, a hop occurs when a packet is passed from one network component to a next network component. For example, data packets pass through routers as they travel from a source (e.g., server hosting the plug-in module) to a destination (e.g., server hosting the target database). The hop count (number of hops) refers to the number of network devices through which data passes when traveling from the source to the destination. Since each hop incurs a delay, a large number of hops between source and destination increases lag and reduces real-time performance. The server hosting the plug-in module may be directly connected to the server hosting the target database, resulting in zero hops.

Individual plug-in modules receive generic database commands from the UI. Each plug-in module converts the generic database commands (received from the UI) into commands understood by the target database (e.g., database specific commands). For example, the target database may include Mongo database (DB), Percona, PostgreSQL, Neo4J, Tiger Graph, Cassandra, Elastic Search, Oracle, mySQL, MariaDB, MSSQL, or another type of database. The target database provides a result of executing the database specific commands to the plug-in module. In some cases, the plug-in module may convert the result received from the target database into a generic result. The plug-in module sends the result (or the generic result) to the UI. The UI displays the result (or the generic result). In some cases, if multiple results are provided by multiple databases, then the UI may organize the multiple results into a single cohesive result. For example, a user may request payroll information for each employee in an enterprise. In this example, assume the enterprise has payroll information stored in multiple databases based on the enterprise having acquired multiple companies. To illustrate, assume the enterprise has a first database from a first vendor (e.g., Oracle) storing payroll information associated with the enterprise and a second database from a second vendor (e.g., MongoDB) storing payroll information associated with a recently acquired company. The UI sends a set of generic command (e.g., "provide payroll info for all employees") to a first plug-in module associated with the first database and to a second plug-in module associated with the second database. The first plug-in module converts the generic command into a command understood by the first database (e.g., Oracle). In response, the first database provides a first result to the first plug-in module, and the first plug-in module sends the first result to the UI. The second plug-in module converts the generic command into a command understood by the second database (e.g., MongoDB). In response, the second database provides a second result to the second plug-in module and the second plug-in module sends the second result to the UI. The UI receives the first result from the first plug-in and the second result from the second plug-in and merges the two results to create a consolidated result. The user can then view the consolidated result in different ways, such as alphabetical order by employee last name, ascending or descending order of salary, grouped by job function, or the like. For example, the user may view the salaries grouped based on job function to identify salary discrepancies between an employee at the first company and an employee at the second company that do similar work (e.g., similar job function) and have similar experience levels but are compensated differently and work with human resources to reduce the disparity in salary between the two employees.

The plug-in module may be installed prior to installation of the database. For example, if an enterprise is installing multiple databases, the enterprise may identify the target servers on which the databases are to be installed and use the UI to install corresponding plug-in modules on additional servers near the target servers. The UI may send an instruction to each of the plug-in modules to initiate installation of the databases on the target servers. Individual plug-in modules create a persistent authentication session between the plug-in module and the target server, to reduce repetitive authentication, before initiating installation of a particular vendor's database on the target server. In addition, because each plug-in is able to handle installation of a database on a target server, the systems and techniques described herein are able to concurrently (in parallel) install multiple databases. For example, six plug-in modules can concurrently (in parallel, simultaneously) install six databases on to six target servers, thereby significantly speeding up installation as compared to installing each database sequentially, e.g., installing a database on a first target server and, after completing the database installation, installing the database on a second target server, and so on.

Thus, systems and techniques described herein enable databases from multiple database providers to be installed and queried quickly and easily using a central UI. The UI communicates with a plug-in module that is located on a server that is close (e.g., relatively few hops) to a target server on which a particular database is installed. Because the plug-in module is located close to the target server, there is relatively a small amount of latency in executing commands. Further, the plug-in module uses a persistent authentication session with the target server to reduce repetitive authentication during installation. In addition, the use of a plug-in module corresponding to each target server (on which a particular database is installed) enables multitasking and concurrent command execution. For example, a query may request information from two different databases. The databases may be from the same vendor or from two different database providers (e.g., Oracle and MongoDB). Both requests are handled concurrently (rather than sequentially), resulting in faster execution. Because each plug-in module converts generic commands received from the UI into database specific commands, databases from multiple database providers can be easily managed using a single UI. In contrast, in a conventional system, a user (e.g., system administrator) may use a first vendor's UI to install and query databases associated with the first vendor, a second vendor's UI to install and query databases associated with the second vendor, and so on, making it difficult for the system administrator to have an end-to-end view of all the databases in the system. The systems and techniques described herein enable multiple databases, regardless of the database vendor associated with individual databases, to be managed from a single UI. For example, the user can back-up a first vendor's database using a second vendor's database.

As a first example, a computing device (e.g., also known as an application server) includes one or more processors and one or more non-transitory computer-readable storage media to store instructions executable by the one or more processors to perform various operations. The operations include receiving, via a user interface, an instruction to install a particular database on a plurality of target servers including at least a first target server and a second target server. The operations include identifying a plurality of servers near the plurality of target servers. For example, the first server is near the first target server if (i) the first server is less than a threshold number of hops from the first target server, (ii) the first server has less than a threshold latency when communicating with the first target server, or both (i) and (ii). The second server is near the second target server if (i) the second server is less than the threshold number of hops from the second target server, (ii) the second server has less than the threshold latency when communicating with the second target server, or both (i) and (ii). The plurality of servers including at least a first server and a second server. The first server is near the first target server and the second server is near the second target server. The operations include causing a first plug-in module to be installed on the first server and causing a second plug-in module to be installed on the second server. The operations include concurrently sending a database install command to the first plug-in module and to the second plug-in module. The database install command causes: (1) the first plug-in module to initiate a first installation of a first database on the first target server and (2) the second plug-in module to initiate a second installation of a second database on the second target server concurrently with the first installation. In some cases, the first database and the second database have a same database provider (e.g., Oracle). In other cases, the first database is provided by a first database provider (e.g., Oracle) and the second database is provided by a second database provider (e.g., MongoDB) that is different from the first database provider. In some cases, the first plug-in module creates a first persistent authentication session with the first target server before initiating the first installation of the particular database on the first target server and the second plug-in module creates a second persistent authentication session with the second target server before initiating the second installation of the particular database on the second target server. The operations may include receiving, via a user interface, user input comprising one or more commands and performing natural language processing on the user input to: determine a user intent and identify one or more databases associated with the one or more commands. The operations may include determining one or more plug-ins associated with the one or more databases. The operations may include converting the one or more commands into a set of generic commands. The operations may include concurrently sending the set of generic commands to each of the one or more plug-ins associated with the one or more databases. Individual plug-ins of the one or more plug-ins may receive the set of generic commands, convert the set of generic commands to particular commands to be executed by a particular database of the one or more databases, send the particular commands for execution to the particular database, and receive a result of performing the particular commands to the particular database. In some cases, the one or more databases may include a first database associated with a first database provider (e.g., Oracle) and a second database associated with a second database provider (e.g., MongoDB) that is different from the first database provider. The operations may include receiving one or more results. For example, each result of the one or more results may be received from each plug-in of the one or more plug-ins. The operations may include converting each result into a standardized format to create standardized results, merging the standardized results to create a merged result, and displaying the merged result via the user interface. The operations may include receiving a first log from the first database. For example, the first log may include a first informational log or a first error log. The operations may include receiving a second log from the second database. The second log may include a second informational log or a second error log. The operations may include performing, using a machine learning algorithm, an analysis of the first log and the second, determining, using the machine learning algorithm, an issue causing at least one of the first log or the second log, determining, using the machine learning algorithm, one or more possible solutions to address the issue, and displaying, via the user interface, the one or more possible solutions.

As a second example, a memory device is used to store instructions executable by one or more processors to perform various operations. The operations include receiving, via a user interface, an instruction to install a particular database on a plurality of target servers comprising at least a first target server and a second target server. The operations include identifying a plurality of servers near the plurality of target servers. The plurality of servers include at least a first server near the first target server and a second server near the second target server. The first server near the first target server indicates that the first server is (i) less than a threshold number of hops from the first target server, (ii) the first server has less than a threshold latency communicating with the first target server, or both. The second server near the second target server indicates that the second server is (i) less than a threshold number of hops from the second target server, (ii) the second server has less than a threshold latency communicating with the second target server, or both. The operations include causing a first plug-in module to be installed on the first server. The operations include causing a second plug-in module to be installed on the second server. The operations include concurrently sending a database install command to the first plug-in module and to the second plug-in module. The database install command causes the first plug-in module to initiate a first installation of the particular database on the first target server and causes the second plug-in module to initiate a second installation of the particular database on the second target server concurrently with the first installation. The first plug-in module creates a first persistent authentication session with the first target server before initiating the first installation of the particular database on the first target server and the second plug-in module creates a second persistent authentication session with the second target server before initiating the second installation of the particular database on the second target server. The operations may include receiving one or more logs from at least one target server of the plurality of target servers. For example, the one or more logs may include at least one of an informational message or an error message. The operations may include performing an analysis of the one or more logs using a machine learning algorithm. The operations may include determining, using the machine learning algorithm, one or more suggestions to address the one or more logs. The operations may include displaying, via the user interface, the one or more suggestions. The operations may include determining that an update is available for the particular database from a provider of the particular database, downloading the update from the provider of the particular database, and instructing the first plug-in module to apply the update to the first installation of the particular database. The operations may include receiving a first plurality of results from the first plug-in module, receiving a second plurality of results from the second plug-in module, converting the first plurality of results into first standardized results, converting the second plurality of results into second standardized results, merging the first standardized results and the second standardized results to create a merged result, and displaying the merged result via the user interface. The operations may include receiving one or more logs from the first target server, determining, using a machine learning algorithm, an issue causing at least one log of the one or more logs, determining, using a knowledgebase, that the issue causing the at least one log has a solution comprising a software update, obtaining the software update, and instructing the first plug-in module to apply the software update to the first target server.

As a third example, a computer-implemented method includes receiving, via a user interface executed by one or more processors, an instruction to install a particular database on a plurality of target servers comprising at least a first target server and a second target server. The method includes identifying, by the one or more processors, a plurality of servers near the plurality of target servers. The plurality of servers include at least a first server and a second server, where the first server is near the first target server and the second server is near the second target server. The first server is near the first target server when (i) the first server is less than a threshold number of hops from the first target server, (ii) the first server has less than a threshold latency communicating with the first target server, or both. The second server is near the second target server when (i) the second server is less than a threshold number of hops from the second target server, (ii) the second server has less than a threshold latency communicating with the second target server, or both. The method includes causing a first plug-in module to be installed on the first server and causing a second plug-in module to be installed on the second server. The method includes concurrently sending a database install command to the first plug-in module and to the second plug-in module. The database install command causes the first plug-in module to initiate a first installation of a first database on the first target server and causes the second plug-in module to initiate a second installation of a second database on the second target server concurrently with the first installation. The first plug-in module creates a first persistent authentication session with the first target server before initiating the first installation of the particular database on the first target server and the second plug-in module creates a second persistent authentication session with the second target server before initiating the second installation of the particular database on the second target server. The first database is associated with a first database provider (e.g., Oracle) and the second database is associated with a second database provider (e.g., MongoDB) that is different from the first database provider. The method may include receiving a first plurality of results from the first plug-in module, receiving a second plurality of results from the second plug-in module, converting the first plurality of results into first standardized results, converting the second plurality of results into second standardized results, merging the first standardized results and the second standardized results to create a merged result, and displaying the merged result via the user interface. The method may include receiving a first log from the first database. The first log includes a first informational log or a first error log. The method may include receiving a second log from the second database. The second log may include a second informational log or a second error log. The method may include performing, using a machine learning algorithm, an analysis of the first log and the second log, determining, using the machine learning algorithm, an issue causing at least one of the first log or the second log, determining, using the machine learning algorithm, one or more possible solutions to address the issue, and displaying, via the user interface, the one or more possible solutions.

Figure 1:
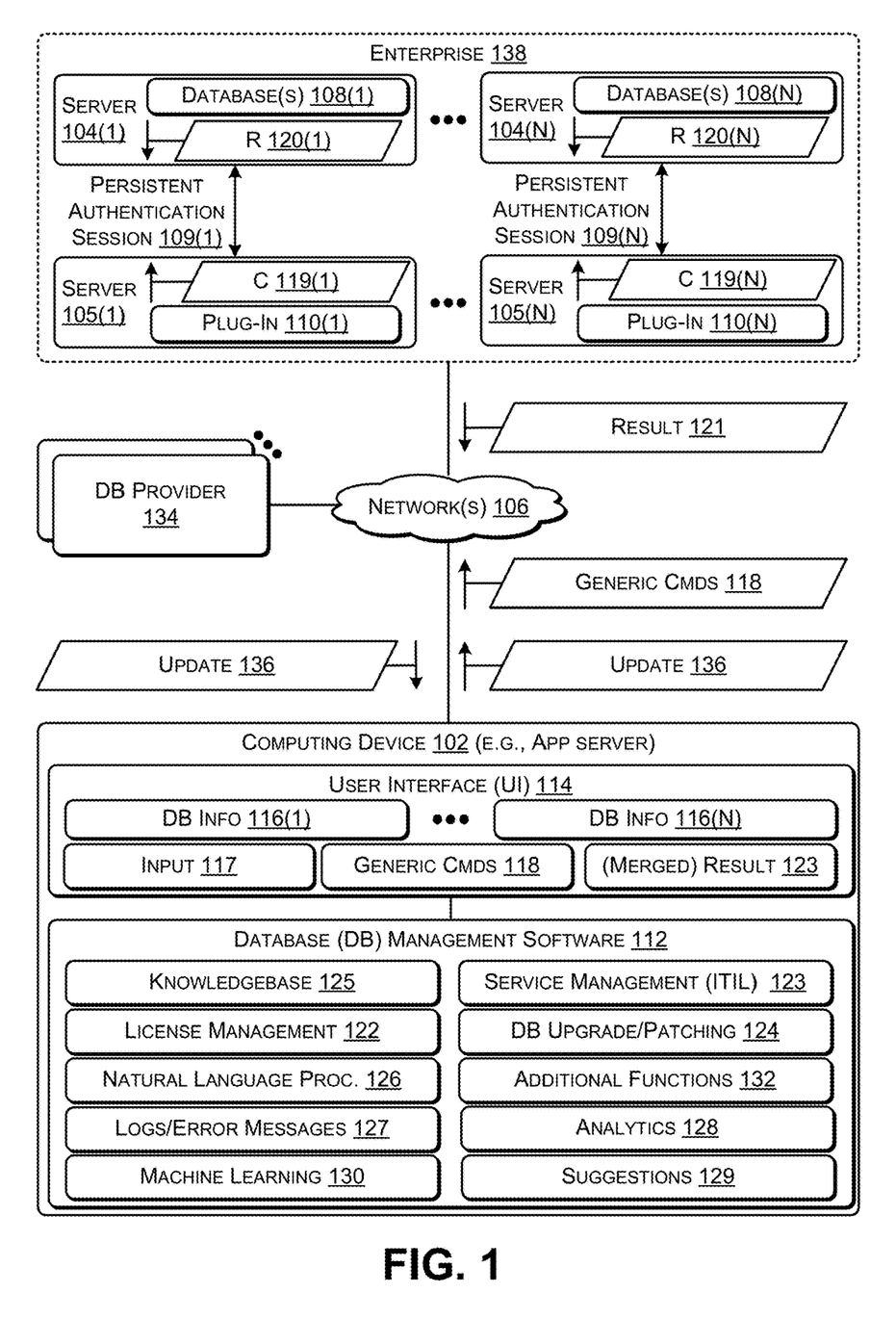
FIG. 1 is a block diagram of a system that includes a user interface (UI) and a machine learning algorithm to manage databases from multiple database providers, according to some embodiments.

FIG. 1 is a block diagram of a system 100 that includes a user interface (UI) and a machine learning algorithm to manage databases from multiple database providers, according to some embodiments. The system 100 includes a computing device 102 (e.g., an application server) connected to multiple servers 104(1) to 104(N) and 105(1) to 105(N) (N>0) via one or more networks 106. The servers 104, 105 may be associated with an enterprise 138. The computing device 102 may be referred to as a console, a terminal, an application server, or the like and may be used by an information technology (IT) professional, such as a system administrator, to perform administrative functions to manage computing devices (e.g., the servers 104, 105) in the enterprise 138.

Each of the one or more servers 104, 105 may include, for example, cloud-based servers, customer premises-based servers, virtualized servers, such as containers, Kubernetes, docker, and the like, and other types of servers that are capable of hosting databases, such as databases 108. Each of the servers 104 may host one or more of the databases 108. For example, the server 104(1) may host database 108(1) and the server 104(N) may host database 108(N). Each of the servers 105 may host a plug-in 110. For example, the server 105(1) may host a plug-in 110(1) and the server 105(N) may host a plug-in 110(N).

Each of the databases 108 may have a corresponding plug-in 110. For example, the database 108(1) may have a corresponding plug-in 110(1) and the database 108(N) may have a corresponding plug-in 110(N). Each of the plug-ins 110 may be installed in a server 105 that is close to the servers 104 hosting the corresponding databases 108. The term "close" means that, from a network perspective, each plug-in 110 can communicate, with a relatively small amount of latency (delay), with the corresponding databases 108. In some cases, a particular plug-in 110 may be installed on the same server 104 as the corresponding databases 108. In other cases, a particular plug-in 110 may installed on a server 105 that can communicate with a server 104 (that is hosting the corresponding database 108) with less than a threshold number of hops. In this way, each of the plug-ins 110 is able to communicate with the corresponding databases 108 with a relatively small amount of latency (delay). In some cases, the plug-in 110 may maintain a persistent authentication session 109 with the servers 104 hosting the corresponding databases 108. For example, the plug-in 110(1) may maintain a persistent authentication session 109(1) with the server 104(1) hosting the corresponding database 108(1) and the plug-in 110(N) may maintain a persistent authentication session 109(N) with the server 104(N) hosting the corresponding database 108(N). By maintaining the persistent authentication session 109 between the plug-in 110 and the corresponding databases 108, the plug-in 110 may reduce or avoid repeatedly authenticating with the servers 104 (e.g., when installing the databases 108), thereby enabling faster communications between the plug-ins 110 and the servers 104. Each plug-in 110 may have a "1 to 1" or a "1 to many" relationship with the databases 108. For example, in some cases, a particular plug-in 110(N) may interact with multiple databases 108 (e.g., with the multiple databases being from the same vendor). In other cases, a particular plug-in 110(N) may interact with a single database 108(N).

The computing device 102, sometimes referred to as an application server, may include database management software 112 that can be accessed using a user interface (UI) 114. For example, UI 114 may be implemented as a graphical user interface (GUI). The UI 114 may display database information ("DB info") 116 associated with the databases 108. To illustrate, the DB info 116(1) may display information associated with the database 108(1) and the DB info 116(N) may display information associated with the database 108(N). The UI 114 may enable a user to zoom in and zoom out of the DB info 116. For example, if the user fully zooms out, the UI 114 displays the status ("health") of each of the databases 108. The status may be color-coded, e.g., green indicating no issues, yellow indicating a potential problem (e.g., resulting in extra logs, error messages, or both), and red indicating a problem (e.g., database is not operating normally, database is inaccessible, or the like). The user can select one of the DB info 116 to zoom in and see more details. For example, selecting DB info 116(N) may cause the UI 114 to display additional details about database 108(N). If the health is good (e.g., a green color), then the UI 114 may display statistics, such as average execution time of a command, how many transactions are being processed per second, how much storage capacity is being used, and the like. If the health is poor (e.g., a yellow color), then the UI 114 may display the same statistics, display logs and/or error messages, display suggestions (e.g., recommend adding storage, recommend reconfiguring database, or the like) to improve the statistics and the health. If the health is unhealthy (e.g., a red color), then the UI 114 may display the statistics, if applicable, and indicate issues, such as a database failure, drive failure, processor failure, server issue(s), or the like. The database management software 112 is a tool capable of seamlessly managing multiple types of databases (e.g., MongoDB, Oracle, Cassandra, and the like) using a single UI 114. In this way, a user does not have to use Oracle management software to manage Oracle databases, MongoDB management software to manage MongoDB databases, Cassandra management software to manage Cassandra databases, and so on.

The database management software 112 may provide various functions including, for example, license management 122, database (DB) upgrade/patching 124, natural language processing 126, analytics 128, machine learning 130, and additional functions 132. The database management software 112 may receive logs and error messages 127 from the databases 108. The machine learning 130 may perform analytics 128 on the logs and error messages 127 and identify issues with the databases 108 and provide (e.g., predict) possible solutions 129. For example, if the logs and error messages 127 indicate that a particular server 104 on which a particular database 108 is installed has insufficient storage capacity, then the machine learning 130 may provide the suggestions 129 that include adding additional storage capacity to the particular server 104. As another example, if the logs and error messages 127 indicate that a particular server on which a particular database is installed is encountering latency issues, then the suggestions 129 may include adding additional memory (e.g., for use as a cache), adding a faster processor, adding a faster communications interface, or the like. The natural language processing 126 may use representation learning or deep neural network learning algorithms. The machine learning 130 may use supervised learning (e.g., support vector machine or the like), unsupervised learning, or reinforcement learning algorithms. The additional functions 132 may include, for example, backup (e.g., creating a backup of one or more of the databases 108), monitoring a health of the databases 108, consolidating two or more of the databases 108 into a single database, containerization, replication of one or more of the databases 108, security compliance, migration (e.g., migrating a database from a customer-premises server to a cloud-based server or from a cloud-based server to a customer premises server), provisioning, decommissioning, standards compliance, release management (e.g., managing releases of a database management software for each database provider) and other database operation administrative tasks.

The UI 114 may receive input 117 from a user, such as a system administrator (or another IT professional). The input 117 may be input using a keyboard (e.g., text input), a microphone (e.g., audio input), a mouse (e.g., menu selection), or another type of input device. The UI 114 may convert the input 117 into generic commands 118 (e.g., get payroll information for all employees) and display the generic commands 118 via the UI 114. The generic commands 118 are database commands that are used internally by the database management software 112 and the plug-ins 110 and are not specific to any particular vendor's database. The plug-ins 110 convert the generic commands 118 into database specific commands that are understood by a particular vendor's database (e.g., Oracle, MongoDB, or the like). For example, user may provide the input 117 by using a keyboard to type the commands (e.g., query, modify, or the like) that the user desires to be performed, selecting an item from a drop-down menu, speaking into a microphone, or the like. The database management software 112 may use the natural language processing 126 to analyze the input 117 to determine the generic commands 118. After viewing the generic commands 118 on the UI 114 and verifying that the generic commands 118 are correct, the user may commit the commands 118, causing the generic commands 118 to be sent to the appropriate plug-in 110. The database management software 112 may determine, based on the input 117, which of the databases 108 are to receive the commands and send the generic commands 118 to the corresponding plug-in 110.

One or more of the plug-ins 110 may receive the generic commands 118. For example, if the user has made a request for payroll information, then the generic commands 118 may be sent to the corresponding plug-ins 110 associated with those databases 108 that include payroll-related information. Each plug-in 110 is capable of converting the generic commands 118 into database specific commands 119 (e.g., database management commands for a particular type of database) that the corresponding database 108 is capable of understanding and executing. For example, if the databases 108(N) are Oracle databases, then the plug-in 110(N) may translate the generic commands 118 into the corresponding Oracle commands 119(N), if the databases 108(N) are MongoDB databases, then the plug-in 110(N) may translate the generic commands 118 into the corresponding MongoDB commands 119(N), and so on. The databases 108 perform the database specific commands 119 and provide a result 120 of performing the commands 119. For example, if the commands 119 include a query, then the result 120 include the results of performing the query on the databases 108. If the commands 119 include a request to modify one or more records or fields in the database 108, then the result 120 includes information indicating whether or not the records or fields were successfully modified. If an error was encountered, then the result may include one or more error messages created from performing the database specific commands 119. If some records or fields were successfully modified but others were not, then the result 120 may indicate which records or fields were successfully modified and which records or fields were not. In some cases, the plug-in 110 receives the results 120 from the database 108 and sends a result 121 that may include the result 120 to the database management software 112. In other cases, the plug-in 110 receives the results 120 from the databases 108 and modifies the results 120 to create the results 121 (e.g., converting the database specific results 120 into generic results 121) that are sent to the database management software 112. For example, if the result 120 includes an error message, an error code, or the like, the plug-in 110 may translate the error message or code into a more understandable form and provide additional details regarding the error code or error message in the result 121. As another example, the result 120 may include data formatted in a particular format (e.g., such as a proprietary format) and the plug-in 110 may convert the data from the particular format into a format used by the database management software 112. Thus, in such cases, the plug-in 110 may convert the result 120 into data that is in a format that the database management software 112 is capable of displaying via the UI 114. The database management software 112 may convert each of the results 121 from each of the plug-ins 110 into a standardized format to create result 123 and display the result 123 using the UI 114. If the database management software 112 receives results 121 from each of multiple plug-ins 110, the database management software 112 may convert each result 121 into a standardized format and merge the standardized results to create merged result 123. For example, a request for payroll information may result in two results 121 from two different databases 108. To illustrate, two companies may have merged, or a first company using a first database from a first database provider (e.g., Oracle) may have acquired a second company that uses a second database from a second database provider (e.g., MongoDB). The request for payroll information may be sent to a first plug-in associated with the first database and to a second plug-in associated with the second database. The first database may return first results and the second database may return second results. The database management software 112 may convert the first results into first standardized results and convert the second results into second standardized results and merge the first standardized results and the second standardized results to create the result 123. In this way, even though the payroll information is stored in two separate databases from two different database providers, the results from querying both databases is merged into a single data file, result 123, and presented via the UI 114. For example, the result 123 may be payroll information that includes the names of all employees (e.g., from both companies), each employee's salary information, each employee's home address and so on. A user can sort the result 123 in multiple ways, such as alphabetically by employee name, ascending or descending order of base salary, and the like. Thus, the result 123 may be a resulting of merging the results 121 from multiple databases 108. A user does not need to know that the data the user is querying or modifying may be stored in two or more databases from different database providers and does not need to manually merge the results from each database. Instead, the database management software 112 determines which of the databases 108 store the data being queried or modified by the input 117, performs the query or modifications to the data, and standardizes and merges the results 120 from each of the databases 108.

The database management software 112 may provide numerous functions to manage the databases 108. For example, the database management software 112 may periodically connect with a database management software server 134 associated with a particular type of database to determine whether an update 136 is available. The update 136 may include a software update, a patch, a bug fix, or the like. If available, the database management software 112 may download the update 136 and apply the update 136 to the appropriate databases 108. For example, the database management software 112 may contact the MongoDB database management software server 134, determine that the update 136 is available, download the update 136, and apply the update 136 to those of the databases 108 that are Mongo-based databases.

The database management software 112 includes service management 123 to provide an Information Technology Infrastructure Library (ITIL) to provide database operation management. Service management 123 includes change management, problem management, event management, and other operational database management tools. For example, when a problem occurs with the database 108(N) or the server 104(N) (e.g., CPU utilization is high in one of the servers 104), the service management 123 creates an incident report and an associated ticket that is sent to an information technology (IT) professional for resolution. The IT professional investigates the problem, determines a solution (e.g., software update, firmware update, or the like), and applies the solution. After determining that the solution addresses the problem, the IT professional updates the ticket to indicate the solution, and the information (e.g., problem and solution) is stored in knowledgebase 125. In the future, if the same (or similar) problem arises, the service management 123 performs a search and, if a solution was previously identified and stored in the knowledgebase 125, then the service management 123 may automatically (without human interaction) apply the previously identified solution that is stored in the knowledgebase 125. In this way, the system 100 is self-healing because after a solution to a problem is identified, any future occurrences of the problem are automatically addressed by applying the appropriate solution from the knowledgebase 125. In some cases, if the database 108(N) is a production database (e.g., a database that is in-service and processing transactions), then before applying a solution, a change management process may be followed to obtain permission(s) from those affected by making a change to the database 108(N), scheduling the change (e.g., application of the solution), and then applying the change to the database 108(N), the server 104(N), or both. Thus, a separate software product to provide ITIL functions is not needed because the database management software 112 includes ITIL functions.

Of course, the database management software 112 provides various additional functions, such as license management 122, where each installation of the databases 108 has a corresponding license, thereby ensuring that the enterprise 138 does not have any unlicensed (e.g., unauthorized) database installations. The database management software 112 may include the capability of monitoring each of the databases 108 to determine a health status of each of the databases 108. The database management software 112 may include the capability to configure and/or reconfigure each of the databases 108. For example, if the current configuration of one of the databases 108 is not ideally suited for storing a particular type of data, then the database management software 112 may have the capability of reconfiguring the databases 108 to a configuration more suited for storing a particular type of data. The database management software 112 may include administrative capabilities to provide credentials to database administrators to access the databases 108. The administrative capabilities may include the ability to provide different levels of access, such as a read-only access, read write access, or the like. The database management software 112 may monitor the health of each of the databases 108 and display the status of the health via the user interface 114 so that the user can see the health of all the databases 108 on a single screen and then drill down (e.g., zoom in) to view the health of individual databases 108.

Thus, a database management software provides a UI to manage databases from multiple database providers. One or more databases from the same vendor (e.g., Oracle, MongoDB, Cassandra, or the like) that are located on a same server (or nearby servers) may have a corresponding plug-in. Each server on which a plug-in is installed may be located close to one or more servers hosting the databases to reduce network latency for communications between the plug-in and the databases. The plug-in may establish a persistent authentication session with one or more of the databases to reduce repeated authentication sessions between each plug-in and the corresponding target server. The plug-in enables multiple installations to be initiated concurrently (simultaneously). The plug-in may receive generic commands from the database management software and convert them into database specific (e.g., vendor specific) database commands that the database is capable of understanding and executing. In this way, the database management software can support databases from multiple database providers. A database from a new vendor can be easily accommodated by creating and installing an appropriate plug-in for the new vendor's database.

Figure 2:
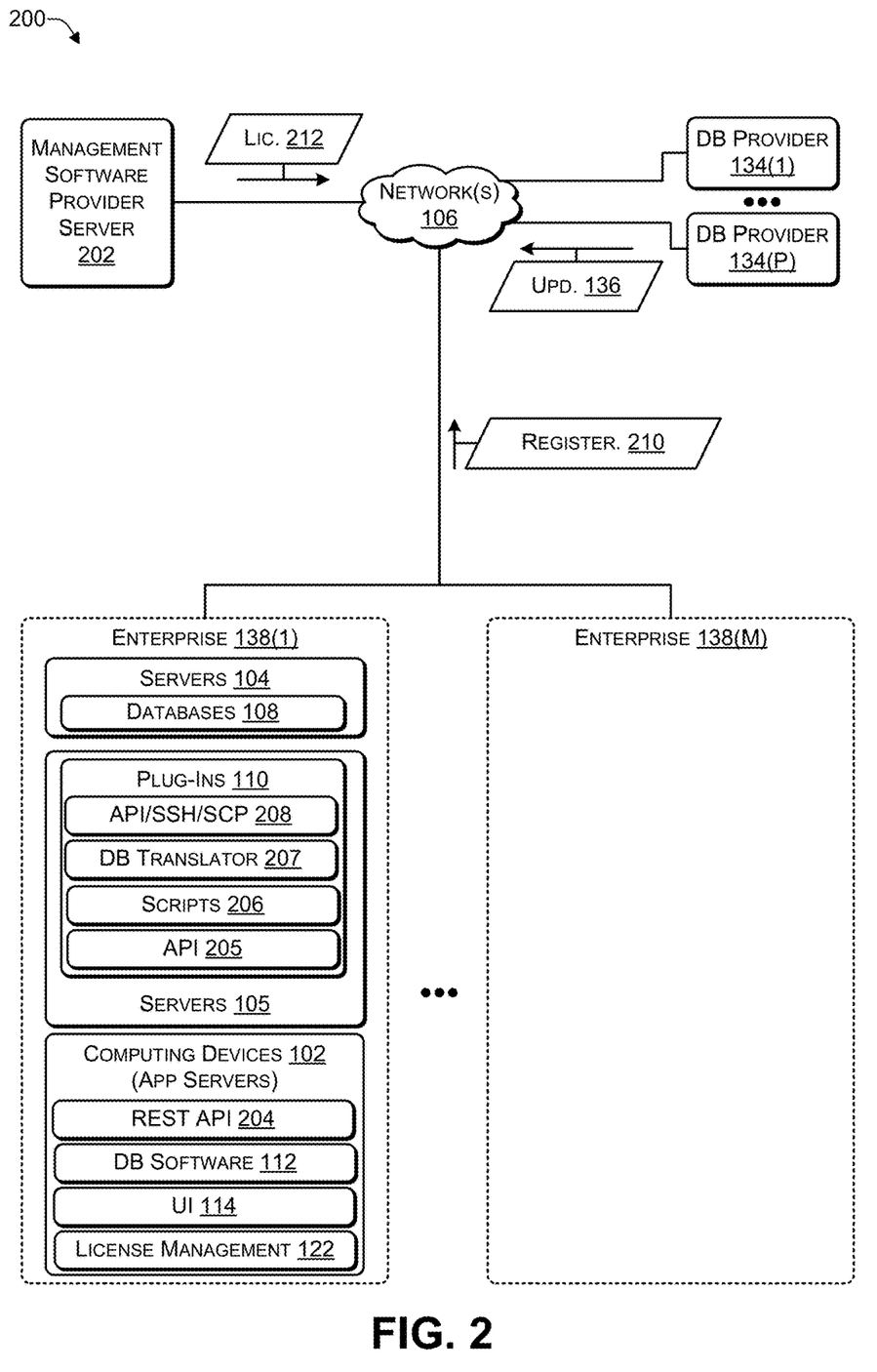
FIG. 2 is a block diagram of a system that includes multiple enterprises, with each enterprise having databases from one or more database providers, according to some embodiments.

FIG. 2 is a block diagram of a system 200 that includes multiple enterprises, with each enterprise having databases from one or more database providers, according to some embodiments. FIG. 1 illustrated the system 100 of a single enterprise system. FIG. 2 illustrates how multiple enterprises 138(1) to 138(M) (M>0) may be connected to the DB management software server 134 via the one or more networks 106. For ease of illustration, the main components in the enterprise 138(1) are illustrated. However, it should be understood that the enterprise 138(M) includes the same (or similar) components to the enterprise 138(1) (as illustrated in FIGS. 1 and 2).

Initially, the representative enterprise 138(M) sends a registration message 210 to register the management software 112 with a management software provider's server 202. The registration message 210 may indicate how many databases 108 are in each of the enterprises 138, the database provider 134 (e.g., Oracle, MongoDB, Cassandra, and the like) of each of the databases 108 in each of the enterprises 138, how many licenses the enterprise 138 has with each of the database providers 134, and other information associated with the databases 108 in the enterprise 138. After receiving the registration message 210, the management software provider server 202 may register the database management software 112 (including the UI 114) to the computing devices 102 (e.g., application servers) the enterprise 138 that sent the registration message 210.

Each of the computing devices 102, sometimes referred to as application servers, may include the database management software 112, the UI 114, and a REST API 204. The REST API 204 is an application programming interface (API) that uses a representational state transfer (REST) architecture and enables interaction with RESTful web services.

Each of the plug-ins 110 may include an API 205 to receive commands, one or more scripts 206, database (DB) translator 207, and API/SSH/SCP 208. The scripts 206 may enable a system administrator to create scripts (e.g., using AWX or a similar scripting language) to automate various tasks that may be repeatedly performed. The API 205 enables each of the plug-ins 110 to receive commands, such as the generic commands 118 of FIG. 1 which the plug-in then converts to the DB specific commands using the DB translator 207 that are sent to the databases 108. The API/SSH/SCP 208 may include an application programming interface (API), a Secure Shell Protocol (SSH) that provides a cryptographic network protocol for operating network services securely over an unsecured network, and a Secure Copy Protocol (SCP).

The management software provider server 202 may register the database licenses, associated with each of the enterprises 138, with the appropriate database provider 134 prior to installing each database 108. For example, if the enterprise 138(M) owns 20 licenses for MongoDB, each time the database management software 112 is asked to install one of the databases 108, the database management software 112 may request the management software provider server 202 to register the license 212 with MongoDB. The management software provider server 202 may obtain a software update 136 (including patches and the like) from one of the database providers 210 and inform the database management software 112 that the software update 136 is available to enable the database management software 112 to apply the software update 136 to one or more of the databases 108 in each of the enterprises 138.

Thus, after an enterprise has registered with the database management software server, the database management software server may provide the database software and the user interface to enable the enterprise to manage databases from multiple database providers. The database management software server may check with the appropriate database provider to determine whether an enterprise has a license prior to installing a database in an enterprise. In this way, the database management software server ensures that unauthorized databases are not being installed in the enterprise. The database management software server a check for software updates (including patches) with the database provider. If a software update is available, the database management software server obtains the software update from the database provider and then updates the databases in the enterprise associated with the database provider. In this way, the database management software server provides automatic updating.

In the flow diagrams of FIGS. 3, 4, 5, and 6 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, 500, and 600 are described with reference to FIGS. 1 and 2 as described above, although other models, frameworks, systems and environments may be used to implement this process.

Figure 3:
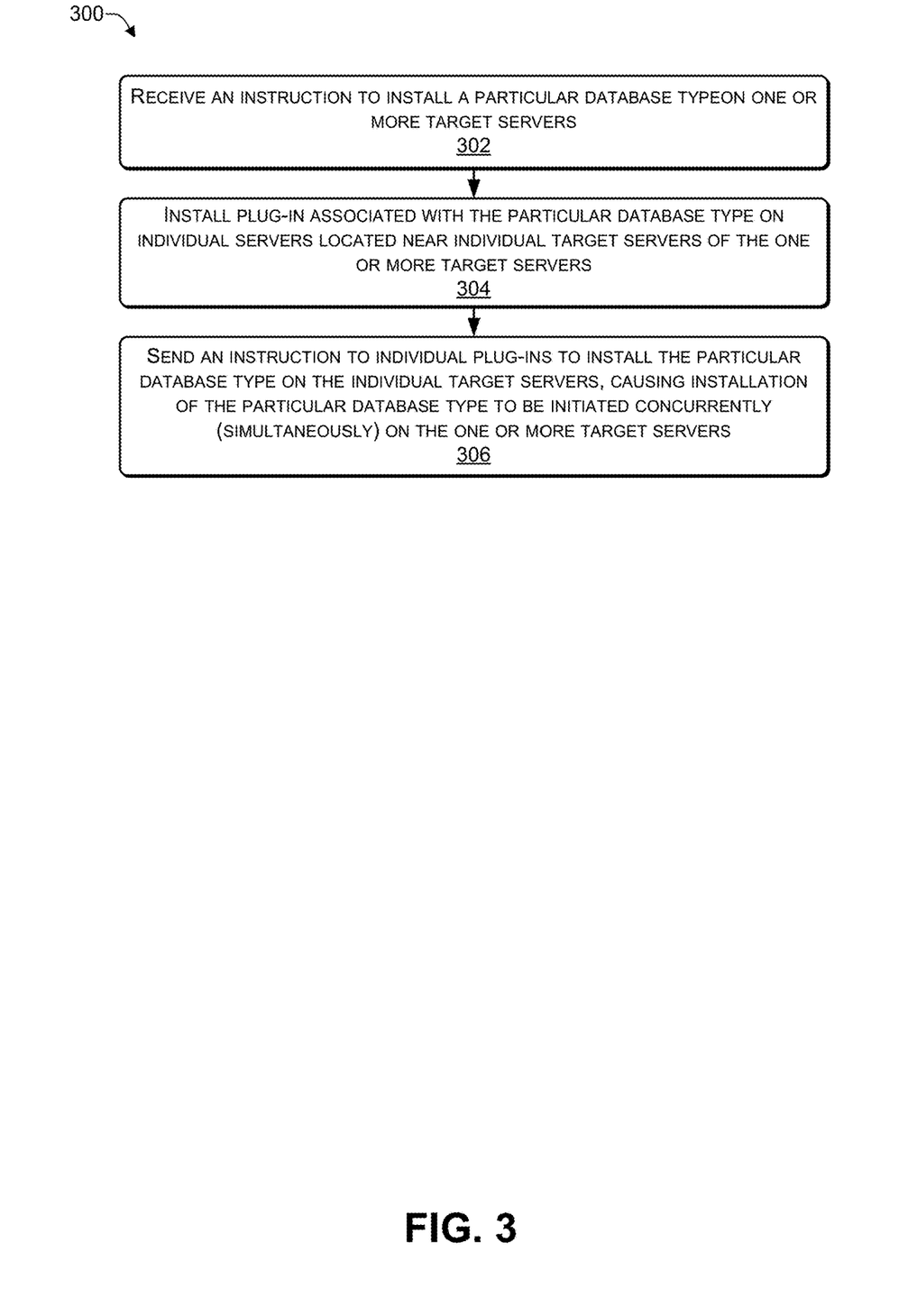
FIG. 3 is a flowchart of a process that includes installing a plug-in near a target server before installing a database, according to some embodiments.

FIG. 3 is a flowchart of a process 300 that includes installing a plug-in near a target server before installing a database, according to some embodiments. The process 300 may be performed by the database management software 112 of FIGS. 1 and 2.

At 302, the process receives an instruction to install a particular database on one or more target servers. For example, in FIG. 1, a user may use the UI 114 to provide input 117 requesting that the particular database 108(N) be installed on the server 104(N).

At 304, the process installs a plug-in associated with the particular database on individual servers located near individual target servers of the one or more target servers. For example, in FIG. 1, the database management software 112 may cause the plug-in 110(N) to be installed either on the target server 104(N) or on the server 105(N) that is near (from a networking standpoint) the target server 104(N). The plug-in 110(N) may be installed on the server 105(N) that is less than a threshold number of hops from the target server 104(N).

At 306, the process sends an instruction to individual plug-ins to install the particular database on the individual target servers, causing installation of the particular database to be initiated concurrently (simultaneously) on the one or more target servers. For example, in FIG. 1, the database management software 112 may send the commands 118 to multiple plug-ins 110 instructing each of the plug-ins 110 to install a particular vendor's database on the target servers 104 corresponding to each of the plug-ins 110. The commands 118 may cause multiple of the plug-ins 110 to concurrently (simultaneously) initiate installation of a particular database 108 on each of the target servers 104.

In this way, multiple databases can be installed quickly because they are installed concurrently rather than sequentially. One advantage of this technique is that the time taken to install multiple databases concurrently is about the same time taken to install a single database. In contrast, the time taken to install multiple databases sequentially is the time taken to install a single database multiplied by the number of databases to be installed.

Figure 4:
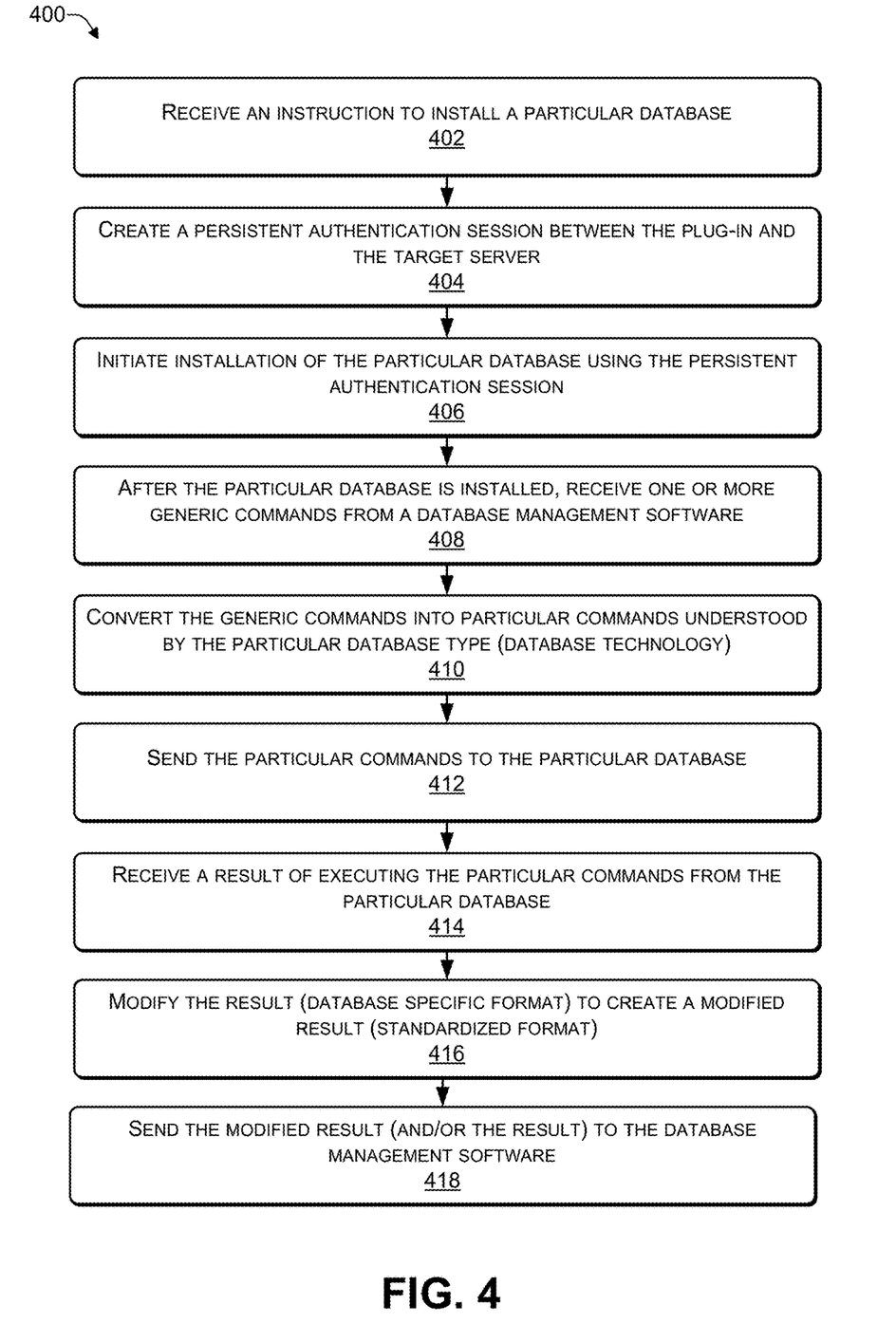
FIG. 4 is a flowchart of a process that includes creating a persistent authentication session between a plug-in and a target server, according to some embodiments.

FIG. 4 is a flowchart of a process 400 that includes creating a persistent authentication session between a plug-in and a target server, according to some embodiments. The process 400 may be performed by one or more of the plug-ins 110 of FIGS. 1 and 2.

At 402, the process receives an instruction to install a particular database. At 404, the process creates a persistent authentication session between the plug-in and the target server. At 406, the process initiates installation of the particular database using the persistent authentication session. For example, in FIG. 1, after the plug-in 110(N) is installed on the server 104(N) or on the server 105(N) that is near the target server 104(N), the plug-in 110(N) may receive an instruction to install the database 108(N) onto the server 104(N). In response, the plug-in 110(N) may create the persistent authentication session 109(N) (e.g., to reduce the number of authentications the plug-in 110(N) performs) and may initiate installation of the database 108(N) on the server 104(N). The plug-in 110 may terminate the persistent authentication session 109(N) after the database 108(N) has been installed on the server 104(N).

At 408, after the particular database is installed, the process may receive one or more generic commands from a database management software. At 410, the process converts the generic commands into particular commands understood by the particular type of database (e.g., Oracle, MongoDB, Cassandra, or the like). At 412, the process sends the particular commands to the particular database. At 414, the process receives a result of executing the particular commands from the particular database. At 416, the process may modify the result (which may be in a database specific format) to a generic (e.g., standardized) format. At 418, the process sends the modified result (and/or the result) to the database management software UI. For example, in FIG. 1, the plug-in 110(N) may receive the generic commands 118 from the UI 114 of the database management software 112. The plug-in 110(N) may convert the generic commands 118 into database specific commands 119(N) that the database 108(N) is capable of understanding and executing and send the commands 119(N) to the database 108(N). For example, the plug-in 110(N) may convert the generic commands 118 into Oracle specific commands 119(N) if the database 108(N) is an Oracle database, into MongoDB specific commands 119(N) if the database 108(N) is a MongoDB, and so on. The database 108(N) receives and executes the commands 119(N) (e.g., query, modify one or more fields, or the like) and returns a result 120(N) of executing the commands 119(N). The term modify includes add, delete, or change one or more fields. The plug-in 110(N) receives the result 120(N). In some cases, the plug-in 110(N) modifies the result 120(N) to create the result 121. For example, the result 120(N) may be in a database specific format and the plug-in 110(N) may convert the result 120(N) into a standardized format to create the result 121. The plug-in 110(N) may provide the result 120(N), the result 121, or both to the database management software 112 as a response to the generic commands 118. The result 121 may include results of a query, whether a request to modify one or more fields was successfully performed, any error messages (or logs) resulting from performing the commands 119(N), and any other results from performing the commands 119(N). The plug-in 110(N) may translate the results 120(1) into generic results 121 and send the results 121 to the computing device 102. In some cases, the plug-in 110(N) may add additional information to the results 121, e.g., additional information about an error message, translate an error code into a human readable message, or the like.

Thus, a plug-in may receive one or more generic commands from a database management software installed on an application server. The plug-in may translate the generic commands into database specific commands for a particular type of database to execute. For example, the plug-in may translate the generic commands into Oracle commands, MongoDB commands, or another type of database specific set of commands based on the type of database that will be executing the commands. The plug-in sends the database specific commands to the database for execution. The database performs the database specific commands and returns a result of performing the database specific commands to the plug-in. The plug-in may send the result provided by the database or the plug-in may modify or add additional information to the result before sending the result to the database management software. The database management software may receive the result and display the result in the UI. One advantage is that a user can send commands to databases from multiple database providers using a single set of commands. The user does not provide database specific commands that each type of database can understand. Instead, the plug-in associated with each database converts the user's commands into database specific commands that each database can execute. Thus, the user can query multiple types of databases without knowing database specific commands. A second advantage is that data stored in multiple types of databases can be gathered, consolidated, and displayed as a single set of data by the database management software. Thus, a user can view data from multiple databases from multiple database providers in a single format, with all the data formatted and displayed consistently.

Figure 5:
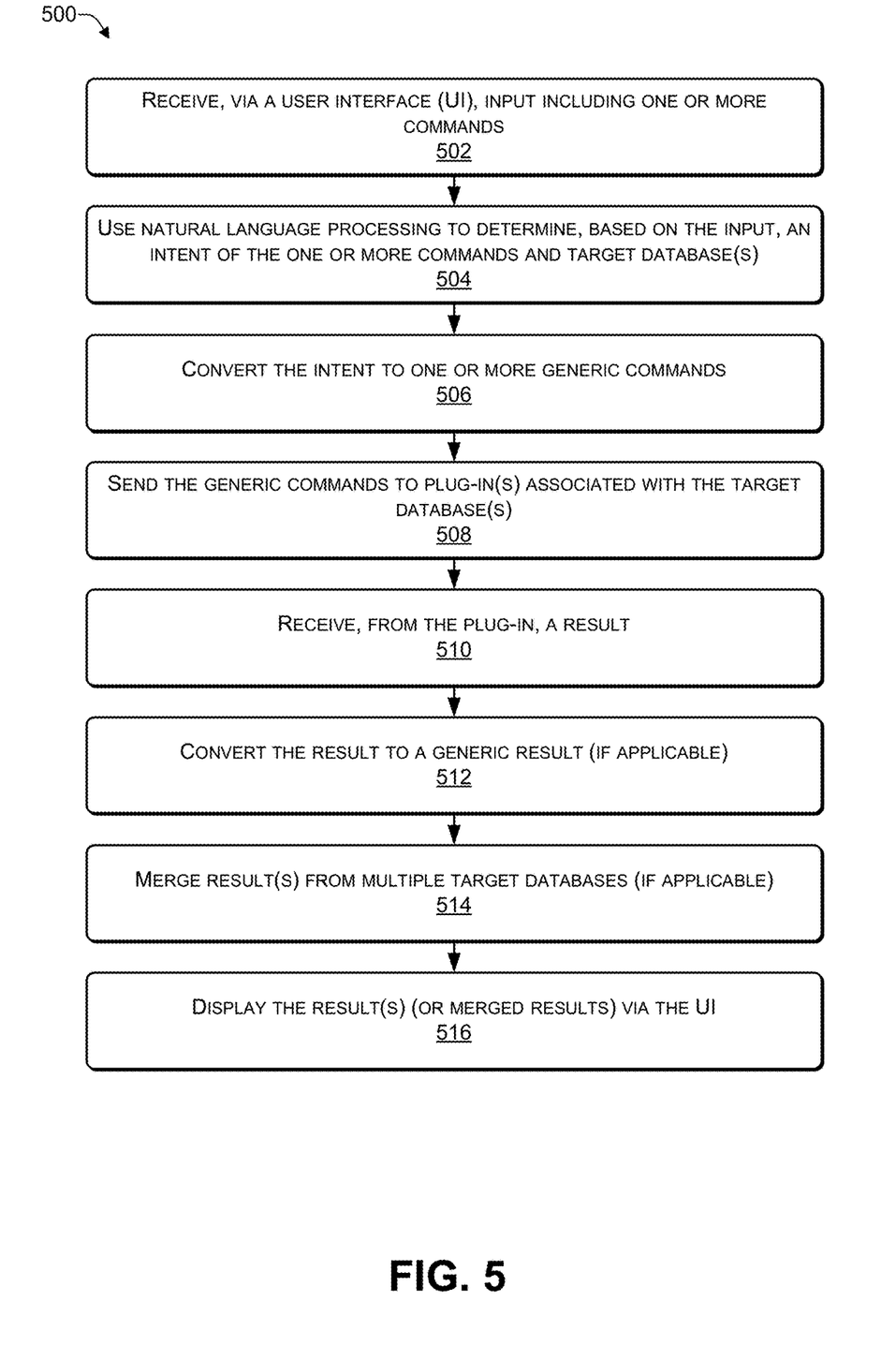
FIG. 5 is a flowchart of a process that includes sending generic commands to a plug-in associated with a target database, according to some embodiments.

FIG. 5 is a flowchart of a process 500 that includes sending generic commands to a plug-in associated with a target database, according to some embodiments. The process 500 may be performed by the database management software 112 of FIGS. 1 and 2.

At 502, the process may receive, via a UI, input including one or more commands. At 504, the process may use natural language processing to determine, based on the input, an intent of the one or more commands and one or more target database(s). At 506, the process may convert the intent into one or more generic commands. At 508, the process may send the generic commands to plug-in(s) associated with the target database(s). For example, in FIG. 1, the database management software 112 may receive the input 117 via the UI 114 and use the natural language processing 126 to determine the intent of the one or more commands and to identify the target database(s) that include the data being targeted by the input 117. Based on the intent, the database management software 112 may create the generic commands 118 and send the generic commands 118 to the plug-in(s) 110 corresponding to the target database(s) 108.

At 510, the process may receive, from the plug-in, a result (either of the target database(s) executing the database specific commands or of the plug-in modifying the result). At 512, the process may, in some cases, convert the result (e.g., database specific result) into a generic result (e.g., in a standardized format). At 514, if results were received from multiple databases, then the process may merge the results to create merged results. At 516, the process may display the results or the merged results via the UI. For example, in FIG. 1, the database management software 112 may receive the result 121 from one or more of the plug-ins 110. The result 121 may include the result 120 of performing the database specific commands 119 to the database(s) 108. The database management software 112 may, in some cases, convert the result 121 into a more generic result. If the database management software 112 receives the result 121 from multiple plug-ins 110 associated with multiple types of databases 108, the database management software 112 may convert each of the individual results into a standardized format and merge the results to form a single interconnected piece of data. For example, if a payroll query is sent to multiple databases (e.g., Mongo, Oracle, and the like), then the results from each of the databases maybe converted into a standardized format and merged. To illustrate, a unique field, such as an employee identifier (e.g., social security number, full legal name, or another type of identifier), may be used to merge the data from multiple databases into a single data file. The results 121 (or the merged results) may be displayed via the UI 114.

Thus, a user can perform commands to multiple databases from multiple database providers using natural language that is analyzed using natural language processing to identify the intent of the user and the databases to which to apply the commands. The user does not need to know the database specific commands and can instead use natural language. The database management software sends the commands to plug-ins corresponding to the appropriate databases. The plug-ins convert the commands into database specific commands and return the results to the database management software. The database management software may convert the results into more human readable results. In some cases, the database management software may merge results from multiple databases from multiple database providers into a single set of data that can be displayed on a user interface. An advantage of this is that the user does not have to reformat results from multiple vendor databases into a standardized format and merge the results to get a single set of data. Instead, the database management software performs the reformatting and merging, thereby enabling a user to execute commands on multiple databases from multiple database providers without knowing the database specific commands and without reformatting and merging the results.

Figure 6:
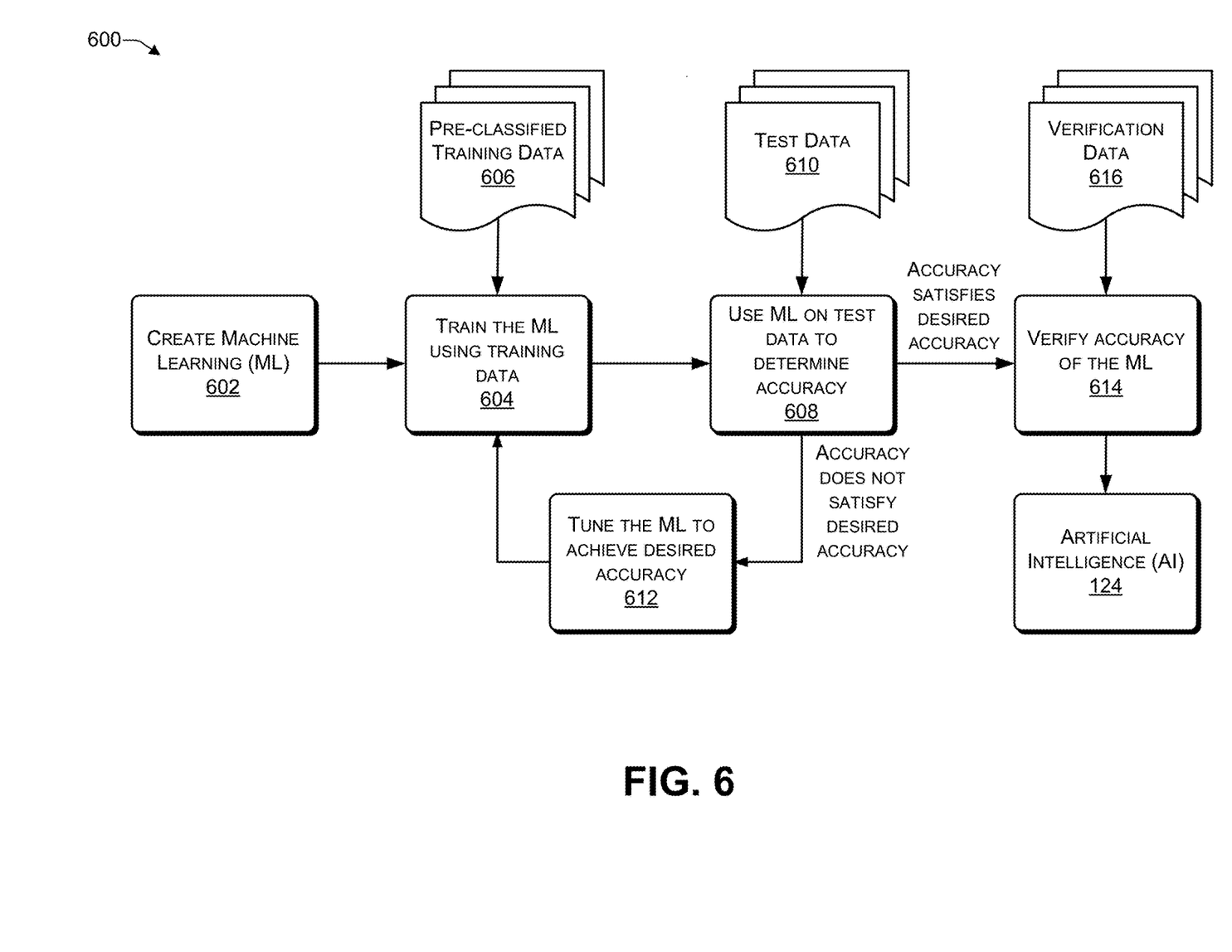
FIG. 6 is a flowchart of a process to train a machine learning algorithm to create a classifier, according to some embodiments.

FIG. 6 is a flowchart of a process 600 to train a machine learning algorithm to create the AI 124, according to some embodiments. The process 600 may be performed by a server, such as the server 106 of FIG. 1.

At 602, a machine learning algorithm (e.g., software code) may be created by one or more software designers. For example, the machine learning algorithm may be the machine learning 130, the natural language processing 126, or both. At 604, the machine learning algorithm may be trained using pre-classified training data 606. For example, the training data 606 may have been pre-classified by humans, by machine learning, or a combination of both. After the machine learning has been trained using the pre-classified training data 606, the machine learning may be tested, at 608, using test data 610 to determine an accuracy of the machine learning. For example, in the case of a classifier, the accuracy of the classification may be determined using the test data 610.

If an accuracy of the machine learning does not satisfy a desired accuracy (e.g., 95%, 98%, 99% accurate), at 608, then the machine learning code may be tuned, at 612, to achieve the desired accuracy. For example, at 612, the software designers may modify the machine learning software code to improve the accuracy of the machine learning algorithm. After the machine learning has been tuned, at 612, the machine learning may be retrained, at 604, using the pre-classified training data 606. In this way, 604, 608, 612 may be repeated until the machine learning is able to classify the test data 610 with the desired accuracy.

After determining, at 608, that an accuracy of the machine learning satisfies the desired accuracy, the process may proceed to 614, where verification data 616 may be used to verify an accuracy of the machine learning. After the accuracy of the machine learning is verified, at 614, the machine learning 130, which has been trained to provide a particular level of accuracy, may be used as the natural language processing 126, the machine learning 130, or both. For example, the machine learning 130 may be trained to analyze the logs/error messages 127 and provide suggestions 129 to address the issues causing the logs/error messages 127.

Figure 7:
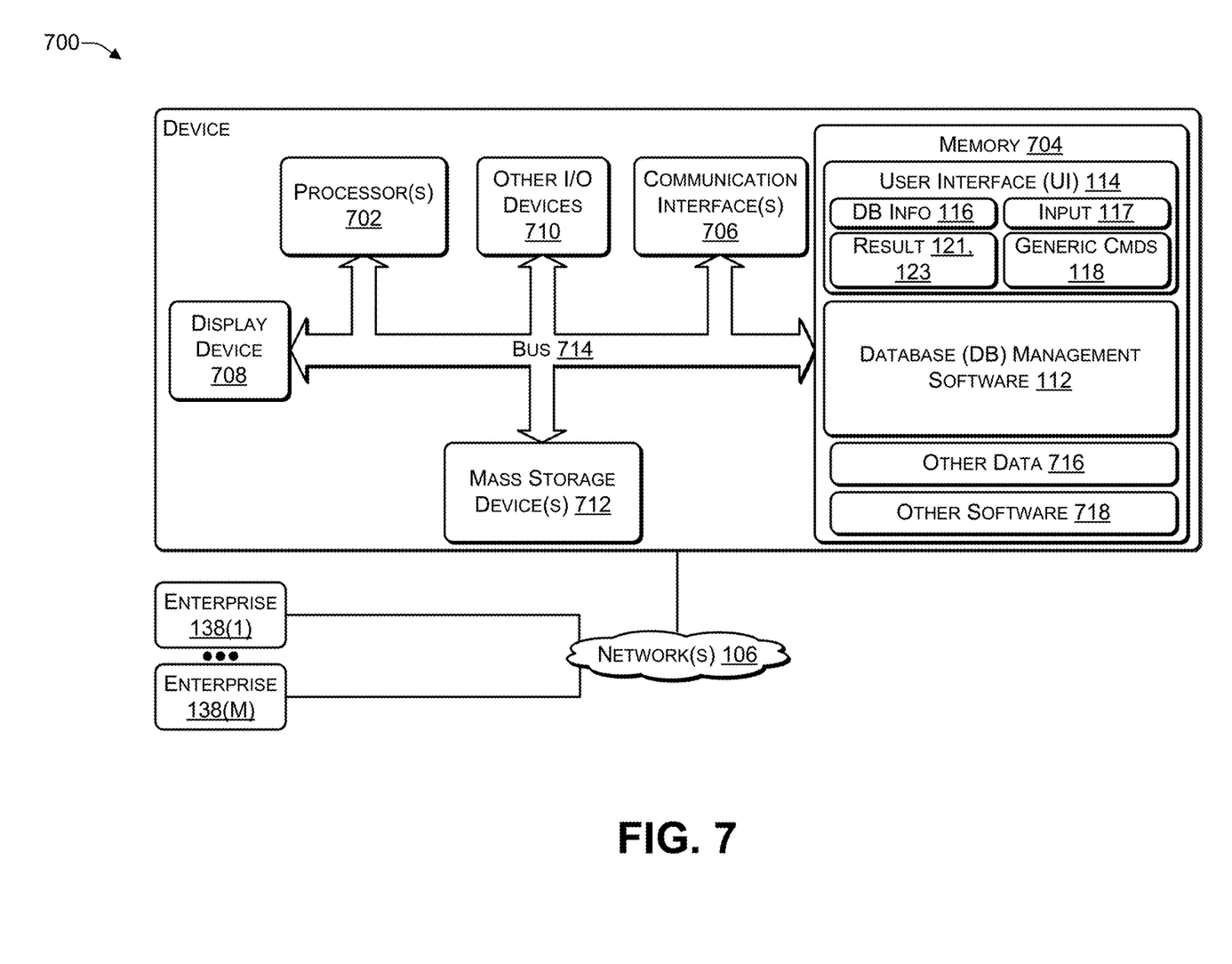
FIG. 7 illustrates an example configuration of a computing device that can be used to implement the systems and techniques described herein.

FIG. 7 illustrates an example configuration of a device 700 that can be used to implement the systems and techniques described herein, such as for example, individual ones of the servers 104, 105, 134, or the device 102. For illustration purposes, the device 700 is illustrated as implementing the computing device 102 of FIGS. 1 and 2.

The device 700 may include one or more processors 702 (e.g., central processing unit (CPU), graphics processing unit (GPU), or the like), a memory 704, communication interfaces 706, a display device 708, other input/output (I/O) devices 710 (e.g., keyboard, trackball, and the like), and one or more mass storage devices 712 (e.g., disk drive, solid state disk drive, or the like), configured to communicate with each other, such as via one or more system buses 714 or other suitable connections. While a single system bus 714 is illustrated for ease of understanding, it should be understood that the system buses 714 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 702 are one or more hardware devices that may include a single processing unit or a number of processing units, all of which may include single or multiple computing units or multiple cores. The processors 702 may include a graphics processing unit (GPU) that is integrated into the CPU or the GPU may be a separate processor device from the CPU. The processors 702 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 702 may be configured to fetch and execute computer-readable instructions stored in the memory 704, mass storage devices 712, or other computer-readable media.

Memory 704 and mass storage devices 712 are examples of computer storage media (e.g., memory storage devices) for storing instructions that can be executed by the processors 702 to perform the various functions described herein. For example, memory 704 may include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein and may be any type of non-transitory media capable of storing computer-readable, processor-executable program instructions as computer program code that can be executed by the processors 702 as a particular machine configured for carrying out the operations and functions described in the implementations herein.

The device 700 may include one or more communication interfaces 706 for exchanging data via the network 106. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 706 can also provide communication with external storage, such as a storage array, network attached storage, storage area network, cloud storage, or the like.

The display device 708 may be used for displaying content (e.g., information and images) to users. Other I/O devices 710 may be devices that receive various inputs from a user and provide various outputs to the user, and may include a keyboard, a touchpad, a mouse, a printer, audio input/output devices, and so forth.

The computer storage media, such as memory 704 and mass storage devices 712, may be used to store software and data, including, for example, the UI 114, the software 112, other data 716, and other software 718. For ease of illustration, not all the software and data is shown.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A server comprising:
one or more processors; and
one or more non-transitory computer-readable storage media to store instructions executable by the one or more processors to perform operations comprising:
receiving, by a first plug-in module executing on the server, an instruction to install a particular database on a first target server that is near the server;
creating, by the first plug-in module, a first persistent authentication session between the server and the first target server; and
initiating, by the first plug-in module, a first installation of a first database on the first target server using the first persistent authentication session;
wherein, concurrently with the first installation, a second plug-in module that is executing on a second server initiates a second installation of a second database on a second target server using a second persistent authentication session, wherein the second target server is near the second server.

2. The server of claim 1, wherein the first target server that is near the server comprises:
the server being less than a threshold number of hops from the first target server;
the server having less than a threshold latency communicating with the first target server; or
any combination thereof.

3. The server of claim 1, the operations further comprising:
receiving, by the first plug-in module, a set of generic commands sent from a computing device;
converting, by the first plug-in module, the set of generic commands to first commands associated with the first database;
sending, by the first plug-in module, the first commands to the first target server for execution by the first database; and receiving, from the first target server, a result of executing the first commands by the first database.

4. The server of claim 3, the operations further comprising:
modifying, by the first plug-in module, the result to create a modified result, wherein:
the result has a first format associated with the first database, and
the modified result has a standardized format; and
sending the modified result to the computing device.

5. The server of claim 1, the operations further comprising:
receiving, from a computing device, an update to the first database installed on the first target server; and
applying, by the first plug-in module, the update to the first database installed on the first target server.

6. The server of claim 1, wherein:
the first database is associated with a first database provider; and
the second database is associated with a second database provider that is different from the first database provider.

7. The server of claim 1, wherein:
the first database is associated with a same database provider as the second database.

8. A memory device to store instructions executable by one or more processors of a server to perform operations comprising:
receiving, by a first plug-in module executing on the server, an instruction to install a particular database on a first target server that is near the server;
creating, by the first plug-in module, a first persistent authentication session between the server and the first target server; and
initiating, by the first plug-in module, a first installation of a first database on the first target server using the first persistent authentication session;
wherein, concurrently with the first installation, a second plug-in module that is executing on a second server initiates a second installation of a second database on a second target server using a second persistent authentication session, wherein the second target server is near the second server.

9. The memory device of claim 8, wherein the first target server that is near the server comprises:
the server being less than a threshold number of hops from the first target server;
the server having less than a threshold latency communicating with the first target server; or
any combination thereof.

10. The memory device of claim 8, the operations further comprising:
receiving, by the first plug-in module, a set of generic commands sent from a computing device;
converting, by the first plug-in module, the set of generic commands to first commands associated with the first database;
sending, by the first plug-in module, the first commands to the first target server for execution by the first database; and
receiving, from the first target server, a result of executing the first commands by the first database.

11. The memory device of claim 10, the operations further comprising:
modifying, by the first plug-in module, the result to create a modified result, wherein:
the result has a first format associated with the first database, and
the modified result has a standardized format; and
sending the modified result to the computing device.

12. The memory device of claim 8, the operations further comprising:
receiving, from a computing device, an update to the first database installed on the first target server; and
applying, by the first plug-in module, the update to the first database installed on the first target server.

13. The memory device of claim 8, wherein:
the first database is associated with a first database provider; and
the second database is associated with a second database provider that is different from the first database provider.

14. The memory device of claim 8, wherein:
the first database is associated with a same database provider as the second database.

15. A computer-implemented method comprising:
receiving, by a first plug-in module executed by one or more processors of a server, an instruction to install a particular database on a first target server that is near the server;
creating, by the first plug-in module, a first persistent authentication session between the server and the first target server; and
initiating, by the first plug-in module, a first installation of a first database on the first target server using the first persistent authentication session;
wherein, concurrently with the first installation, a second plug-in module that is executing on a second server initiates a second installation of a second database on a second target server using a second persistent authentication session, wherein the second target server is near the second server.

16. The computer-implemented method of claim 15, wherein the first target server that is near the server comprises:
the server being less than a threshold number of hops from the first target server;
the server having less than a threshold latency communicating with the first target server; or
any combination thereof.

17. The computer-implemented method of claim 15, further comprising:
receiving, by the first plug-in module, a set of generic commands sent from a computing device;
converting, by the first plug-in module, the set of generic commands to first commands associated with the first database;
sending, by the first plug-in module, the first commands to the first target server for execution by the first database; and
receiving, from the first target server, a result of executing the first commands by the first database.

18. The computer-implemented method of claim 17, further comprising:
modifying, by the first plug-in module, the result to create a modified result, wherein:
the result has a first format associated with the first database, and
the modified result has a standardized format; and
sending the modified result to the computing device.

19. The computer-implemented method of claim 15, further comprising:

receiving, from a computing device, an update to the first database installed on the first target server; and applying, by the first plug-in module, the update to the first database installed on the first target server.

20. The computer-implemented method of claim 15, wherein:
  the first database is associated with a first database provider; and
  the second database is associated with a second database provider that is different from the first database provider.

* * * * *